324-77.

11-16-71 OR 3,621,389

SR

United States Patent

[11] 3,621,389

[72] Inventor Jack T. Murray
Raleigh, N.C.
[21] Appl. No. 837,292
[22] Filed June 27, 1969
[45] Patented Nov. 16, 1971
[73] Assignee International Business Machines Corporation
Armonk, N.Y.

[54] FREQUENCY DOMAIN ANALYZER USING VARIABLE-RATE TIME COMPRESSION
2 Claims, 3 Drawing Figs.

[52] U.S. Cl. .................................................. 324/77 R
[51] Int. Cl. ............................................... G01r 23/16
[50] Field of Search ............................................ 324/77

[56] References Cited
UNITED STATES PATENTS
3,515,990 6/1970 Robertson .................. 324/77

*Primary Examiner*—Edward E. Kubasiewicz
*Attorneys*—Hanifin and Jancin and John B. Frisone ABSTRACT: Contiguous frequency domain analysis of signals is achieved by sampling contiguous epochs of the signal; converting the sampled signal to a digital representation; storing the digital signal in a buffer; reading the stored digital signal a number of times at different reading rates to effect multiple frequency multiplications; converting the different digital signals red read analog equivalents; and passing the different analog signals through a fixed band-pass filter detector to effect an accelerated analysis of the frequency shifted signal.

INVENTOR
JACK T. MURRAY

BY *John B. Trebone*
ATTORNEY

FREQUENCY DOMAIN ANALYZER USING VARIABLE-RATE TIME COMPRESSION

BACKGROUND OF THE INVENTION

1. Field of the Invention

This invention relates to frequency domain analysis and more particularly to frequency domain analysis employing variable rate time compression.

2. Description of the Prior Art

Frequency domain analysis has been accomplished by dividing the spectrum of interest in regions and constructing a plurality of filters each covering one of the regions. (J. L. Flannagan, *Speech Analysis Synthesis and Perception*, Academic Press, Inc., Publishers, 1965, pages 122–124.) This technique is effective, however, the filters are both difficult to fabricate and expensive.

A newer technique (J. S. Gill, *A Versatile Method for Short Term Spectrum Analysis in Real-Time*, Nature, Jan. 14, 1961, pages 117–119), which requires a single filter detector for analysis has been developed. This technique translates the frequency band by a fixed amount and heterodynes the translated band with a programmed stepped oscillator in a mixer circuit thus scanning the band of interest past a frequency domain window provided by the single filter. The fixed frequency transposition is necessary if the incoming signals are to be handled in real time since a number of passes through the mixer are required. This technique eliminates the need for a plurality or bank of filters, however, the mixer involves a complex frequency translation and the frequency bandwidth of the analyzing filter becomes a different percentage of the transposed center frequency as the spectrum is scanned. Both of the above factors, to a limited extent at least, detract from the advantages derived from this technique versus the filter bank technique.

SUMMARY OF THE INVENTION

The invention contemplates a frequency domain analyzer comprising, means for sampling an epoch of an analog signal and converting the sample to digital representations, storage means for storing the digital representations under control of a write clock signal at a first predetermined frequency, means for sequentially reading the stored digital representation at programmed different rates substantially higher than the write clock rate to effect programmed steps of time compression of the stored signal, means for converting each sequential time compressed digital signal to a different analog representation of the stored digital signal, and filter-detector means for analyzing these analog representations to determine the frequency distribution of the energy contents in the original analog signal epoch.

One object of the invention is to provide a frequency domain analyzer which programs several different rates of time compression of a digital representation for an epoch of the analog input signal to achieve analysis by a single filter.

Another object of the invention is to provide a frequency domain analyzer which is inexpensive to manufacture and reliable in operation.

The foregoing and other objects, features and advantages of the invention will be apparent from the following more particular description of a preferred embodiment, as illustrated in the accompanying drawings.

DESCRIPTION OF THE PREFERRED EMBODIMENT

Figure 1:
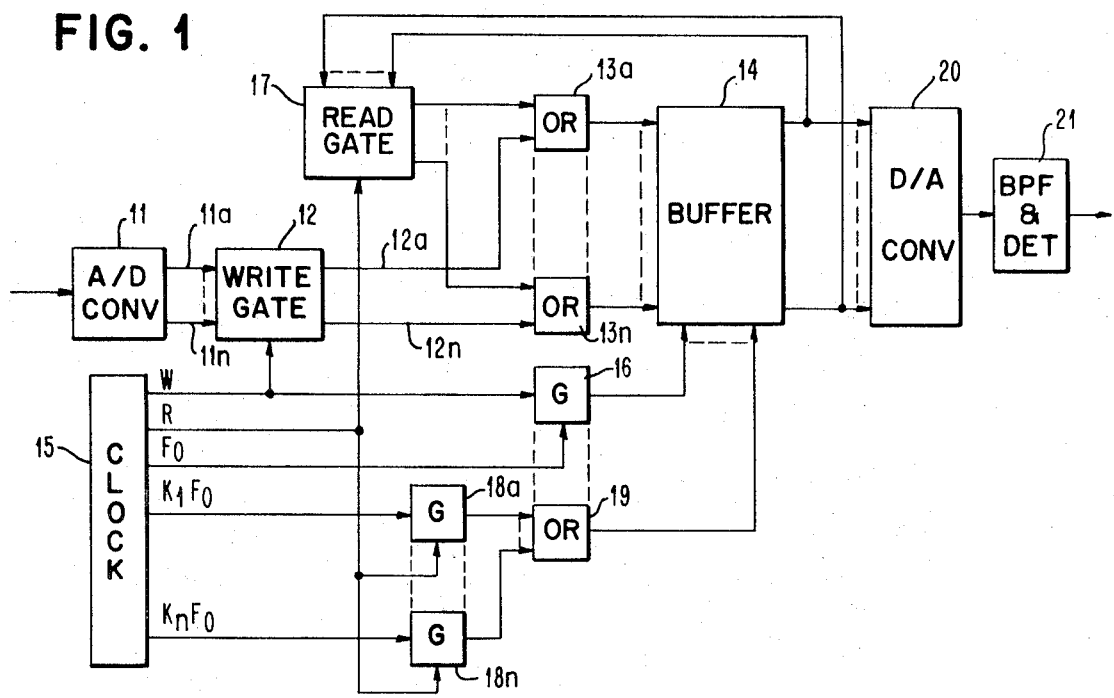
FIG. 1 is a block diagram of a single channel frequency domain analyzer constructed according to the invention.

In FIG. 1, an analog to digital converter circuit 11, which may take many well known forms such as is shown in *Digital Computers and Control Engineering*, R. S. Ledley, McGraw Hill Book Company, Inc., 1960, at paragraph 22–5, has its input connected to a source of electric signals in the audible frequency range. The source of signals is not shown, however, it could be a telephone line, a microphone, tone generators, or any other type of signal sources which are capable of generating electric signals in the audible range. Converter 11 may operate in the pulse code modulation (PCM) mode or delta modulation mode and will provide a binary coded representation on the output conductors 11a through 11n defining the instantaneous characteristic of the analog input signal. Output conductors 11a through 11n are applied to a multichannel digital write gate circuit 12. Write gate circuit 12 has output conductors 12a through 12n which are connected by OR-gates 13a through 13n respectively to the inputs of a read/write buffer circuit 14 which can be formed from standard memory elements such as flip-flop circuits, magnetic cores, etc., as disclosed by Ledley supra at pages 679 and 699.

A multimode programmable control clock provides first a gate signal control W for enabling write gate 12 to permit the passage of the signals from converter 11 through write gate 12 to the buffer 14 via the OR circuit 13a through 13n. In addition, clock 15 provides a buffer clocking signal $F_o$ for writing the data from OR circuit 13a through 13n into the buffer 14 and sampling the converter 11 while gate 12 is enabled. Signal $F_o$ is a repetitive signal at a preselected writing frequency as required by converter 11. This signal is gated in a gate 16 by the write mode, signal W from the clock 15. Thus, during the write mode of clock 15, data from A/D converter 11 is written in successive word positions in the buffer 14 at the frequency supplied by the clock on line $F_o$.

Buffer 14 provides speed conversion via independent read/write clock rates and may take many forms. It may be a sequential shift register or a random access core buffer with a number of word positions sufficient to record the epoch of the input signal at the buffer write frequency of the output of the line $F_o$. It will have as many bit positions in the word as A/D converter provides outputs 11a through 11n. Typically for tone detection, converter 11 provides somewhere between six and eight outputs. That is, six and eight binary digits for coding the signal. In this instance, buffer 14 would have a word length of six to eight digits for storing this data and at a sampling frequency $F_o$ of approximately 8 kHz., 160 words of storage would be required. Buffer 14 may be a core buffer or may include six to eight parallel shift registers, each synchronized by the shift pulses $F_o$ from the clock circuit 15. Thus, the line $F_o$ would control the shifting of the registers. The first register would be connected to the output from OR circuit 13a and the last register to the output from OR circuit 13n. The intervening registers would be connected to the outputs of OR circuits 13b through 13n-1 and all would be stepped by the clock output $F_o$ received at the stepping inputs of the shift registers from gate 16. Many other forms of buffers could be employed. In view of this, the details of the buffer have been omitted since they are well known in the art.

When the input signal epoch of interest has been sampled and stored, line W disables and another clock mode line R enables a read gate 17 which connects the output bit lines of buffer 14 to the input bit lines via OR circuits 13a through 13n whenever the gate 17 is enabled. This forms an end around shift recirculating store.

In addition during the read mode clock 15 provides, in program steps, $n$ mutually independent clock frequencies $K_1F_o$ through $K_nF_o$. These may be derived from a switched bank of crystal oscillators or otherwise provided as shown by E. W. Poppengus et al., *Single Sideband Principles and Circuits*, McGraw Hill Book Co., 1964, Chapter 8. Each of these frequencies is much higher than the writing frequency $F_o$ previously described. These are provided in sequence on lines $K_iF_o$ through $K_nF_o$. The stepping clock signals through gates 18a through 18n and an OR circuit 19 to buffer 14 cause the recirculation of the buffer through its contents at rates proportional to each of the programmed n frequencies. Gates 13a through 13n are enabled by the R output from the clock so that these will only be applied during the multiple read or recirculate cycle of the buffer. For each of the $K_1F_o$ through $K_nF_o$ frequencies, the buffer is recycled clock once. The recycle frequencies are selected to effectuate frequency expansion of the stored signal from buffer 14 for either a contiguous band analysis or for discrete positioning of the input spectrum tones into the detection window as desired. The compressed is applied via a D/A converter 20 which may be the dual of A/D converter 11 above, to a band pass filter-detector 21 which performs a fixed bandwidth frequency analysis and detection. Band pass filter-detector 21 acts as a fixed window as the expanded spectrum is stepped past the window by the successive program stepping $K_iF_o$ from the clock 15.

Figure 2:
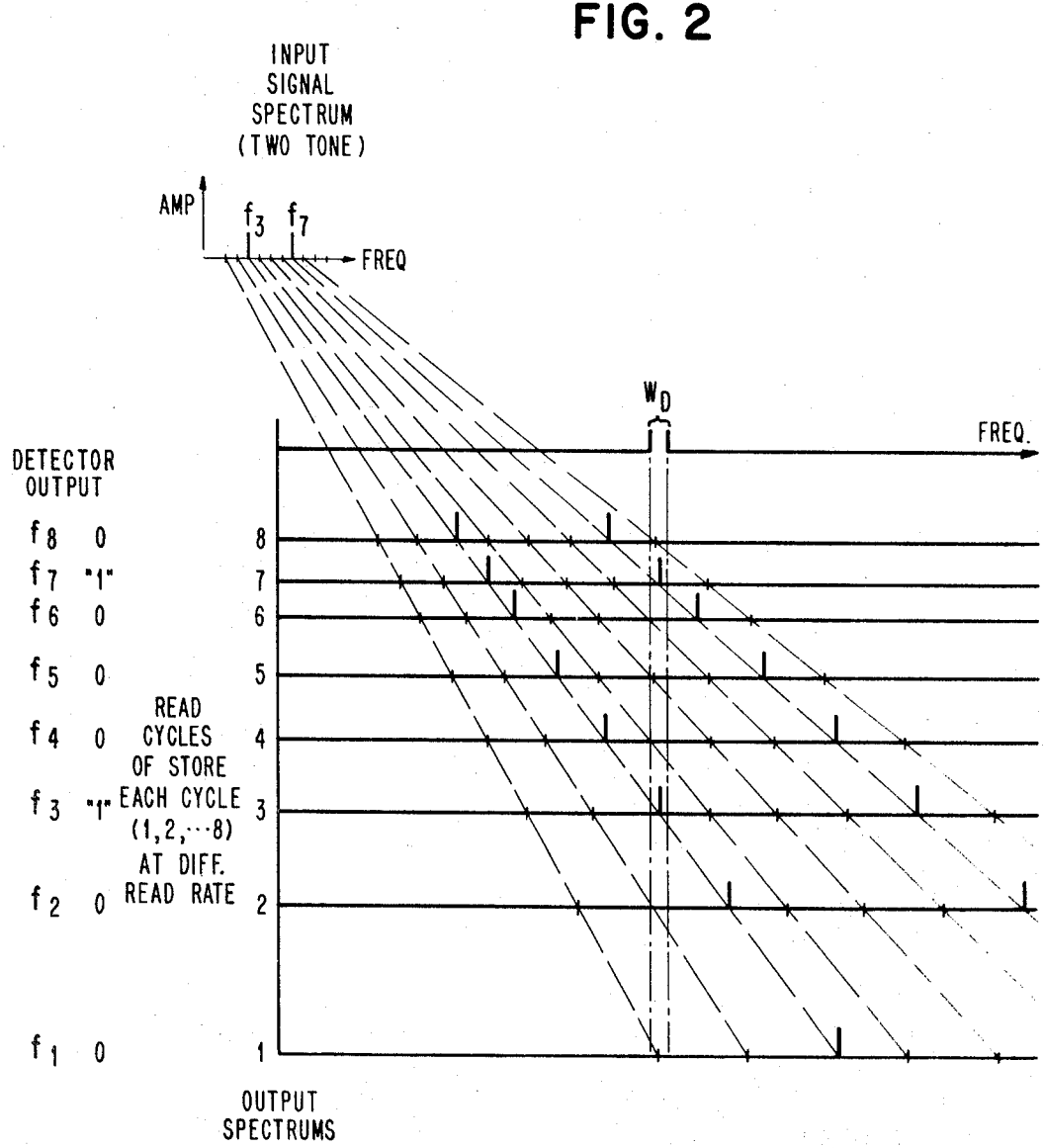
FIG. 2 is a graph illustrating the operation of the analyzer of FIG. 1.

A program sequence of read cycles is performed whereby a set of expanded replicas of the original signal are formed in sequence. Each presents a different portion of the original signal frequency space to the fixed frequency space of the band pass filter-detector. For example successively expanded spectrums of an arbitrary two-toned input signal are shown in the lower part of FIG. 2. Tone pair $F_3$ and $F_7$ from a parallel tone encoder are selected for the input example and are seen in the frequency spectrum versus amplitude plot as the input signal. Tick marks on the base line indicate the spectrum position assigned to the absent tones of the signalling set $F_1, F_2, F_4, F_5, F_6$ and $F_8$. A standard tone detection system would employ a fixed filter detector at each of the positions indicated. FIG. 2 lower portion depicts an arbitrary set of eight spectrums obtained for a selection of different time compression ratios (frequency expansion), obtained from different programmed read cycles of the stored sample representations of the input signal each at a different read clock rate. The single band pass detector with a fixed center frequency is indicated at $W_D$. The presence of a tone burst within the band pass area will be detected as indicated. The sequence of spectrums 1 through 8 in the aggregate present a progressive scan of the original spectrum by the band pass window such that each possible input tone position occurs at the center frequency of the detector once during the complete analysis program. The total program processing time can be short compared to the epoch of the signal. For instance, a typical time duration for the input signal is 40 milliseconds and the time to next service is 45 milliseconds. With 4K samples per second, 160 samples adequately representing the input signal and with the use of monolithic semiconductor storage capable of reading at 1 MHz rates, a mean compression factor of the 175 can be achieved. Thus, for eight tones the total detection program for a single line would take eight passes at 40175 milliseconds per pass which approximates 1.8 milliseconds; therefore, more than 20 inputs could be multiplexed with a single detector channel. Even though the time duration of the input signal to be detected has been compressed, the corresponding increase in bandwidth of the signal due to time compression permits faster rise time detector circuits so that the detection criteria remains approximately the same as in the prior well known filter bank approach. The spectrum analysis obtained with the above system is characterized by a constant percentage bandwidth window. This is desirable for the detection of tones or speech where the detection filters are generally specified in bandwidth as a percentage of the center frequency of the filters.

Figure 3:
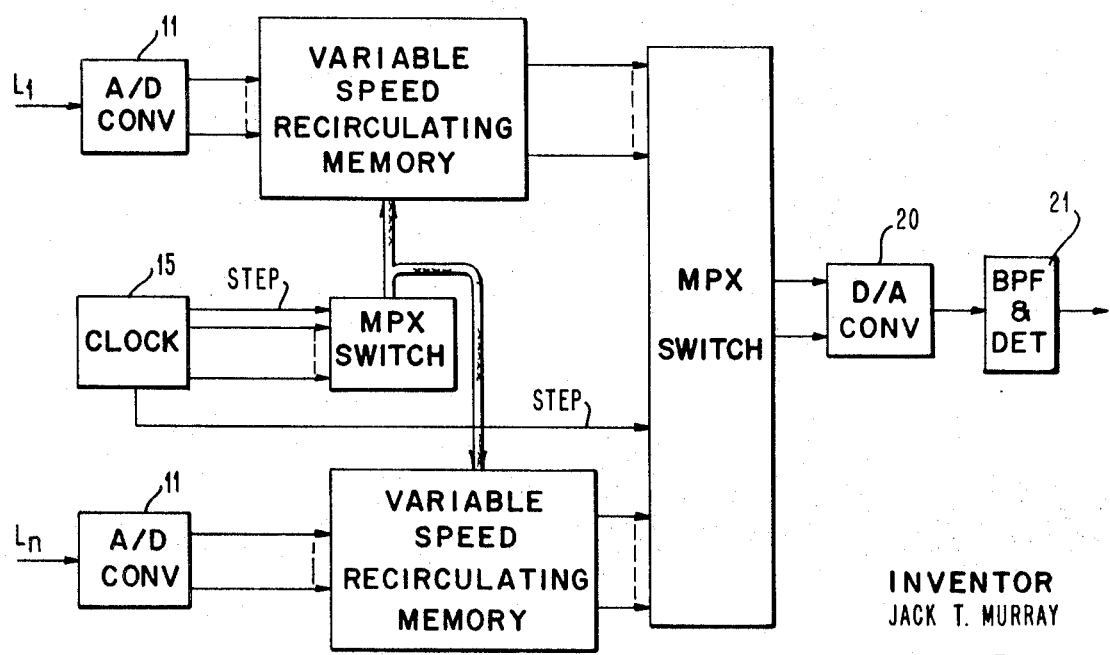
FIG. 3 is a block diagram of a multichannel analyzer using a single analyzing device.

FIG. 3 illustrates the application of the invention to a multiplex frequency domain analyzer for looking at n independent signals on n independent lines and analyzing them in real time. Each of the lines is connected to a circuit identical to that disclosed in FIG. 1. A common clock is utilized and conventional time division multiplex techniques are utilized for distributing the clock pulses to the various lines and for sequentially connecting the recirculating memories described in FIG. 1 via a multiplexing switch to the digital to analog converter circuit 20 and the analyzing band pass filter 21.

While the invention has been particularly shown and described with reference to a preferred embodiment thereof, it will be understood by those skilled in the art that various changes may be made therein without departing from the spirit and scope of the invention.

What is claimed is:
1. A frequency domain analyzer comprising:
means for sampling an epoch of an analog signal and converting the sample to digital representations;
clock means for providing clocking pulses;
storage means for storing the digital representations under control of a write clock signal from said clock means at a first predetermined frequency;
means responsive to said storage means and said clock means for sequentially reading the stored digital representations at n different frequencies each substantially greater than the write clock frequency to effect a stepped time compression of the stored digital signals;
means for converting the sequential time compressed digital signals to analog signals; and
filter means for analyzing the sequential recreated modified analog signals for providing in sequence indicia defining the frequency distribution of the energy in the epoch of the analog signal.
2. A frequency domain analyzer comprising:
means for converting an epoch of a spectrum of analog signals to digital signals corresponding thereto;
a digital signal storage buffer having an input and an output;
means for applying the digital signals corresponding to the epoch of the spectrum of analog signals to the buffer input and writing the digital signal in the storage buffer at a first rate;
means for reading the buffer contents n times at n different rates each of which is substantially greater than the writing rate to effect a stepped time compression of the digital signals corresponding to the epoch of the spectrum of analog signals;
means for converting the stepped time compressed digital signals from the buffer to analog signals; and
filter means for analyzing the recreated stepped time compressed epochs of the analog signal for providing in sequence a plurality of indicia defining the frequency distribution of the energy in the analog signal.

* * * * *